US008276634B2

(12) United States Patent
Checcucci et al.

(10) Patent No.: US 8,276,634 B2
(45) Date of Patent: Oct. 2, 2012

(54) APPARATUS FOR DECORATING OBJECTS

(75) Inventors: Paolo Checcucci, S. Donato Milanese (IT); Giancarlo Fenzi, Illasi (IT)

(73) Assignee: Decoral System USA Corp., Coral Springs, FL (US)

( * ) Notice: Subject to any disclaimer, the term of this patent is extended or adjusted under 35 U.S.C. 154(b) by 893 days.

(21) Appl. No.: 12/294,300

(22) PCT Filed: Mar. 27, 2007

(86) PCT No.: PCT/IB2007/000775

§ 371 (c)(1), (2), (4) Date: Nov. 20, 2008

(87) PCT Pub. No.: WO2007/110752

PCT Pub. Date: Oct. 4, 2007

(65) Prior Publication Data

US 2009/0165959 A1 Jul. 2, 2009

(30) Foreign Application Priority Data

Mar. 27, 2006 (IT) .............................. MI2006A0563

(51) Int. Cl.
*B32B 37/06* (2006.01)

(52) U.S. Cl. ..................................... 156/380.9; 156/382

(58) Field of Classification Search ............... 156/379.6, 156/380.9, 381, 382, 499; 432/141; 118/729, 118/58, 500

See application file for complete search history.

(56) References Cited

U.S. PATENT DOCUMENTS

| | | | | |
|---|---|---|---|---|
| 4,725,227 | A * | 2/1988 | Hailey | 432/239 |
| 5,338,189 | A * | 8/1994 | Hata et al. | 432/124 |
| 6,423,169 | B1 * | 7/2002 | Cobb | 156/230 |
| 2005/0011614 | A1 * | 1/2005 | Benetton | 156/583.1 |

FOREIGN PATENT DOCUMENTS

| | | |
|---|---|---|
| CH | 679 294 | 1/1992 |
| DE | 42 01 377 | 10/1993 |
| EP | 0 424 812 | 5/1991 |
| EP | 0 511 605 | 11/1992 |
| EP | 0 888 905 | 1/1999 |
| EP | 0 953 457 | 11/1999 |
| EP | 1 188 575 | 3/2002 |
| WO | 98/08694 | 3/1998 |

OTHER PUBLICATIONS

International Search Report for PCT/IB2007/000775, mailed Dec. 5, 2007.

* cited by examiner

*Primary Examiner* — Daniel McNally
(74) *Attorney, Agent, or Firm* — Nixon & Vanderhye P.C.

(57) ABSTRACT

An apparatus for decorating objects through sublimation comprises a kiln for heating the objects, a carousel comprising a plurality of arms having a supporting arrangement for supporting the objects, each object being associated with a transferring sheet provided with a sublimable decoration and further comprises a sucking arrangement for sucking air between the transferring sheet and the object.

46 Claims, 6 Drawing Sheets

SEZ.AA'

APPARATUS FOR DECORATING OBJECTS

CROSS-REFERENCE TO RELATED APPLICATIONS

Figures 1, 1B, 2, 2B:
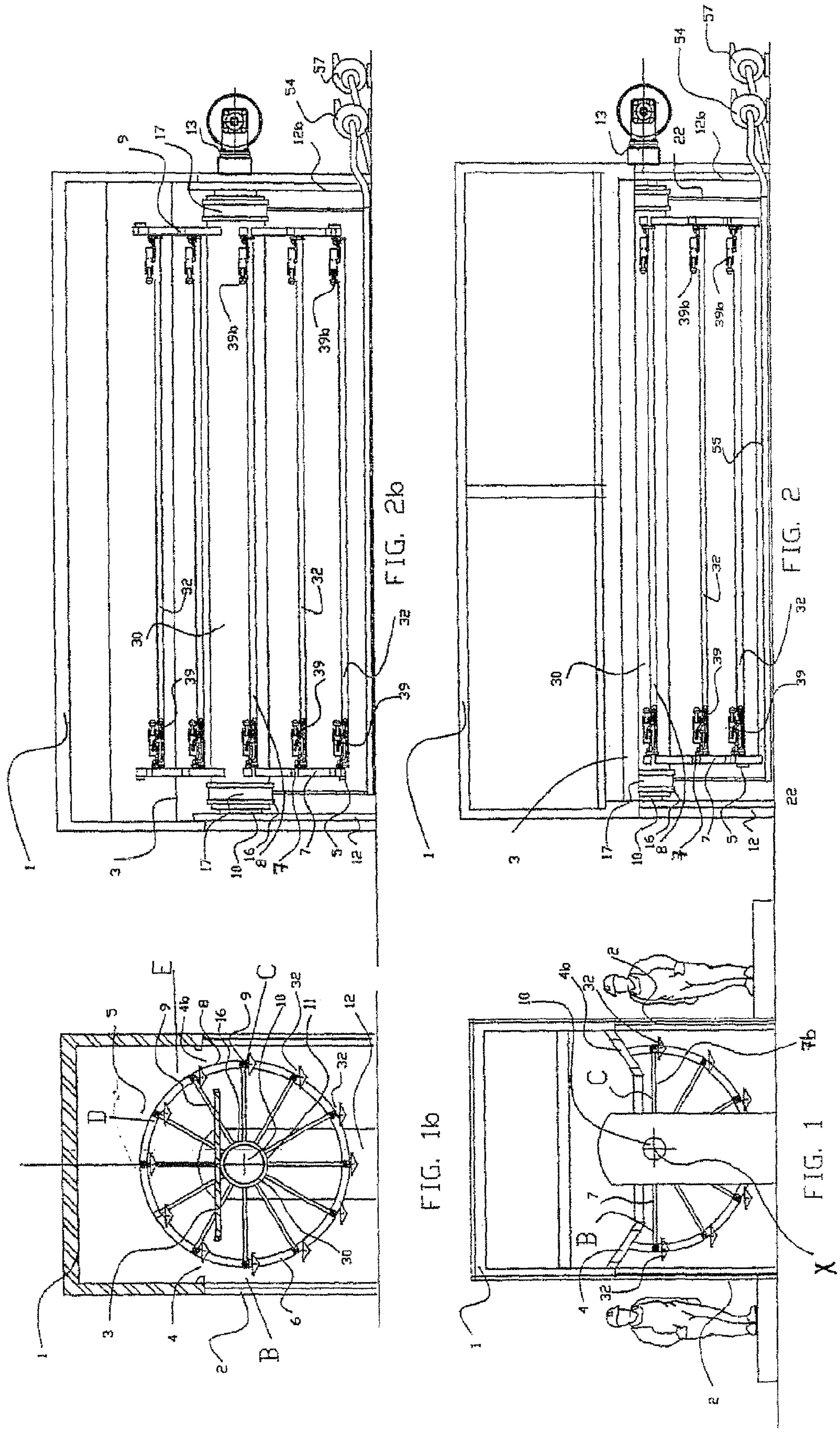

This application is the U.S. national phase of International Application No. PCT/IB2007/000775, filed 27 Mar. 2007, which designated the U.S. and claims priority to Italy Application No. MI2006A000563, filed 27 Mar. 2006, the entire contents of each application is hereby incorporated by reference.

DESCRIPTION

The invention relates to a kiln into which objects to be decorated by sublimation are introduced with a rotatable carousel that carries hanging cradles for loading said objects. This apparatus will, for example, be disclosed for decoration by sublimation, a known process, of profiled sections for fixtures. Sublimation is the passage of a substance from the solid phase to the steam phase without passing through the liquid phase. This decoration technology uses a supporting film that withstands high temperatures and is printed with sublimable inks. In order to transfer the decoration from the film to the object all the surfaces of the object to be decorated are wrapped in said film; through a selected force, the film is kept adhering to the surfaces of the object, as the steam pressure of the sublimation would detach the film from the surfaces, causing the pattern transferred to the surfaces to fade; the object wrapped in the film is introduced into a kiln, or heated by another heating device, to make it reach the preset temperature at which the inks sublimate: the steam pressure of the inks makes them penetrate the surface of the object, transferring the pattern thereto. The process of decorating metal profiled sections generally uses two separate apparatuses. A first apparatus performs the operation of winding the decorating film around the profiled section. This machine, which is known as a packaging machine, is prior art and derives from the packaging industry and is not therefore object of description of this application.

The second apparatus is usually a hot-air heating kiln for taking the profiled section wrapped in the film to the sublimation temperature of the inks and therefore transferring the pattern formed by them to the surfaces of said profiled section painted with polymer paints.

Currently known kilns are of two types: static or tunnel. Static kilns are supplied by one or more external carriages on which the profiled sections are loaded and arranged appropriately that have already been wrapped individually in the film. The two ends of the film enclosures, in which the profiled sections are enclosed longitudinally are connected by the operators to an air sucking arrangement formed of two opposite ports connected by suitable pipes to a blower, which has to be inserted manually into the open ends of the film to suck air from inside the film where the profiled section is contained, in such a way as to obtain a vacuum between the film and the profiled section. In this way the force of the external atmospheric pressure on the film makes it adhere to the profiled section. The carriages then, still keeping the sucking arrangement running in order for the film not to lose adhesion to the profiled section, i.e. to maintain the film adhering to the profiled section and to suck the excess steam generated by sublimation, are introduced into the kiln to reach the temperature necessary to make the inks sublimate. The steam pressure of the sublimation process transfers the decoration into the surface of the profiled sections, which have been previously painted, as is known, with polymer powders. Another type of kiln, defined by the manuals as a tunnel kiln, enables the profiled sections to be prepared in the same way but loading them step-by-step onto a closed-loop chain conveyor carrying opposite suction ports having a resting device for the profiled sections between them. The moving chains introduce from a loading position the profiled sections into the kiln and on the other side, after passing through the kiln for the required time the profiled sections are unloaded.

This type of kiln has great capacity for producing decorated profiled sections, but has had problems relating to the maintenance of aspiration between the film and the profiled section, it having been necessary to find partial suitable pneumatic and mechanical solutions to maintain suction when the profiled sections are moving through the kiln. Suction must therefore create a vacuum that is such as to make the film adhere to the profiled section with sufficient force to oppose to that of the pressure of the steam of the sublimation of the inks, in such a way that the film does not detach from the surface of the profiled section. The object of the invention is to obtain a kiln that is able to maintain or exceed the productivity of the cited and known prior-art systems but which, at the same time can achieve decreases of the initial plant costs, owing to the innovative arrangement if compared with those of similar systems, and also of the occupied surface and of the number of operators, whilst maintaining the same productivity or having greater productivity.

These objects will be achieved by means of a kiln equipped with a rotatable carousel to the arms of which particular cradles are appended on which the profiled sections to be decorated are mounted.

The object of the present invention is therefore a kiln for the continuous-cycle decoration of profiled sections for fixtures that also has the advantage of maintaining the aspiration continuous and effective between the film and the profiled section, although the latter is moving, and maintaining the same production results as kilns defined as tunnel kilns.

As in these processes production of 100-120 decorated profiled sections per hour is deemed to be acceptable, it is necessary for the process and the apparatus of the invention to be able to have the same production level as other types of kiln.

In order to achieve these objects, the solutions will be explained that were adopted by the invention using the following drawings, which are not to scale:

FIGS. 1, 2, 1*b*, 2*b* are front and section views of the kiln.

Figure 4:
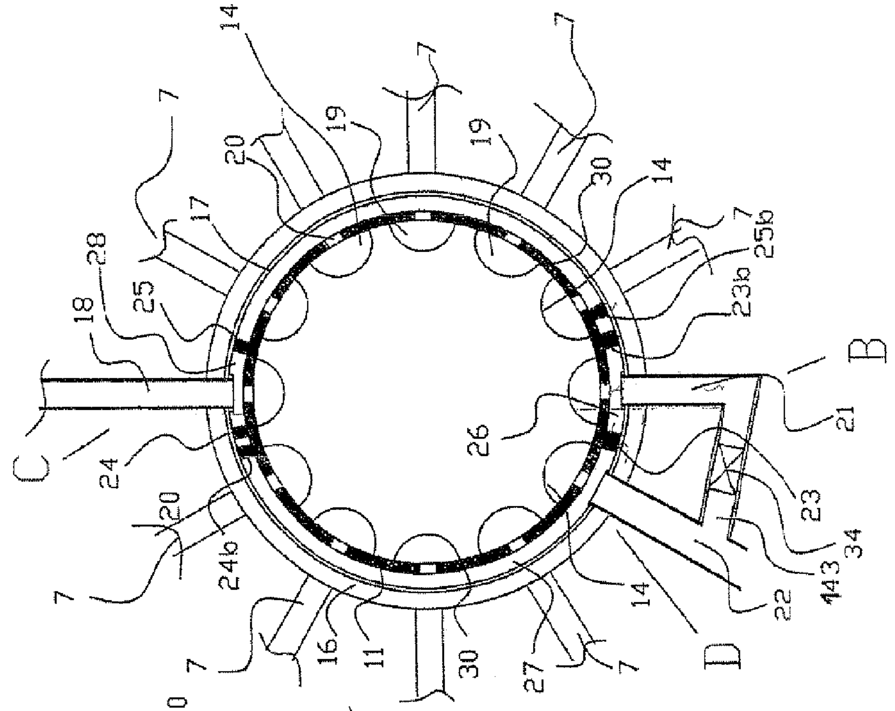
Figure 3:
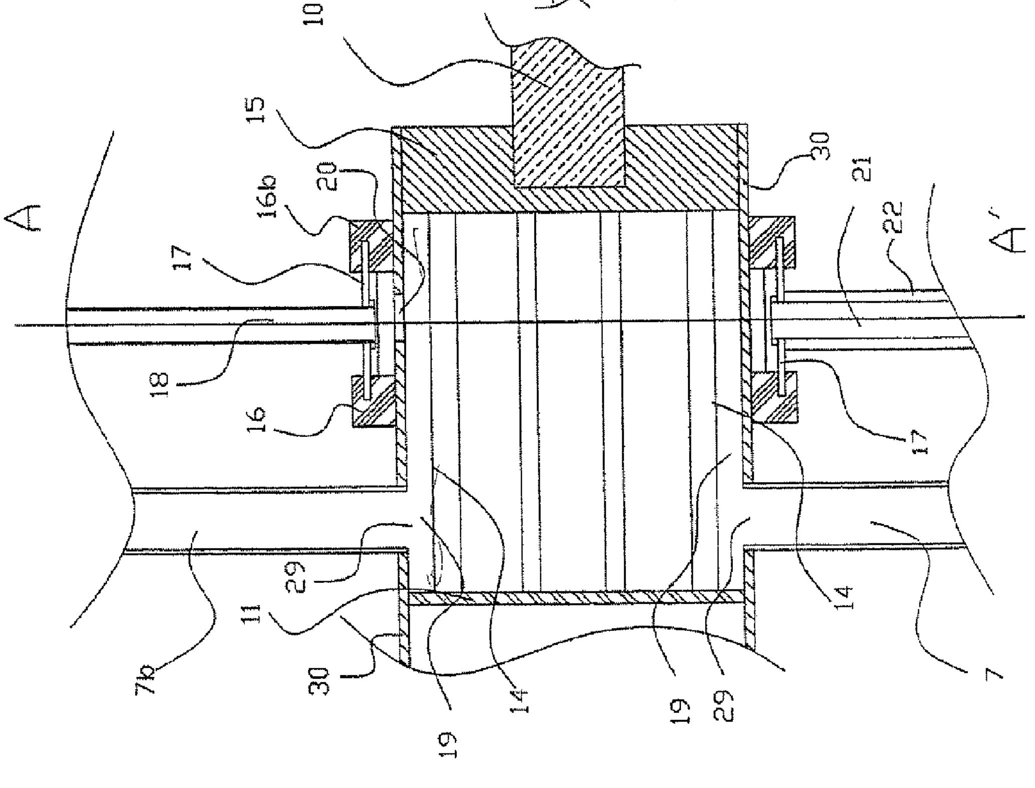

FIGS. 3, 4 are details of the air distribution system.

Figure 4B:
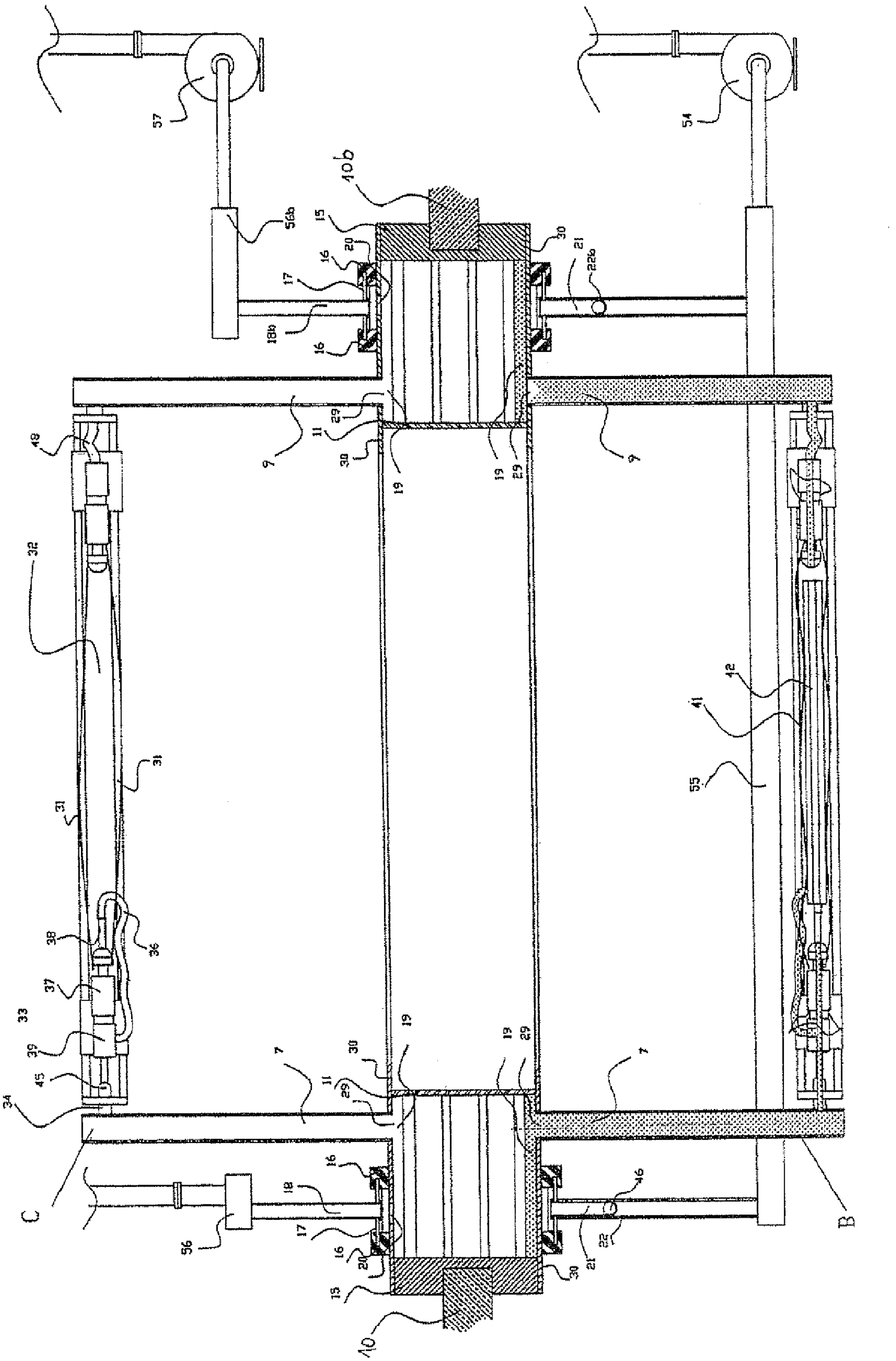

FIG. 4*b* illustrates a functional diagram of the air paths.

FIGS. 5, 6, 6*b*, 7 illustrate details of the apparatus.

Figure 10:
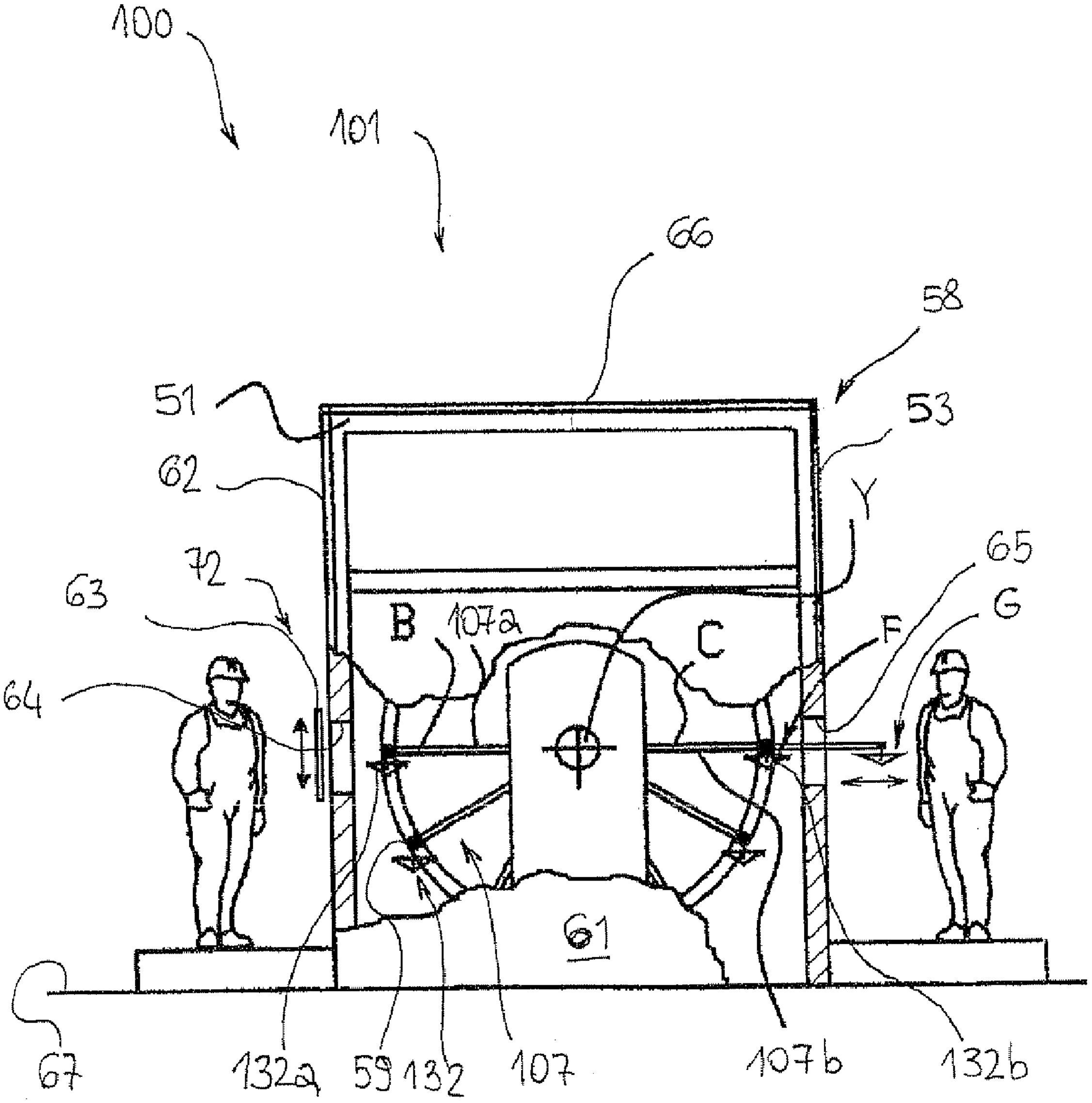

FIGS. 8, 8*b*, 9, 9*b* illustrate the profiled-section bearing cradles;

FIG. 10 is a partially sectioned lateral view of an apparatus for decorating objects through sublimation.

The invention consists of a hot-air kiln 1, with a base 3, FIG. 1, viewed from the left, FIG. 1*b* viewed in cross section, FIG. 2 viewed from the front, FIG. 2*b* viewed in longitudinal section. This kiln, the burner and the internal circulation of the air of which are not shown, being known technologies, is mounted on supporting uprights 2; the kiln 1 has a longitudinal inlet opening 4 for the heating chamber 5, from which a supporting arrangement or cradles 32, bearing profiled sections, enter, i.e. each cradle 32 supporting a profiled section. The cradles 32 are appended to longitudinally opposite arms 7, 9 of a rotatable carousel 8. The kiln 1 has an outlet opening 4*b* for the outlet of said cradles 32. At the ends of the kiln, FIGS. 1*b*, 2*b*, two column supports 12, 12*b* resting on the ground serve the purpose of supporting two pins 10, 10*b*, connected to the two airtight terminals 15 of the hollow shaft

Figures 5, 6, 6B, 7:
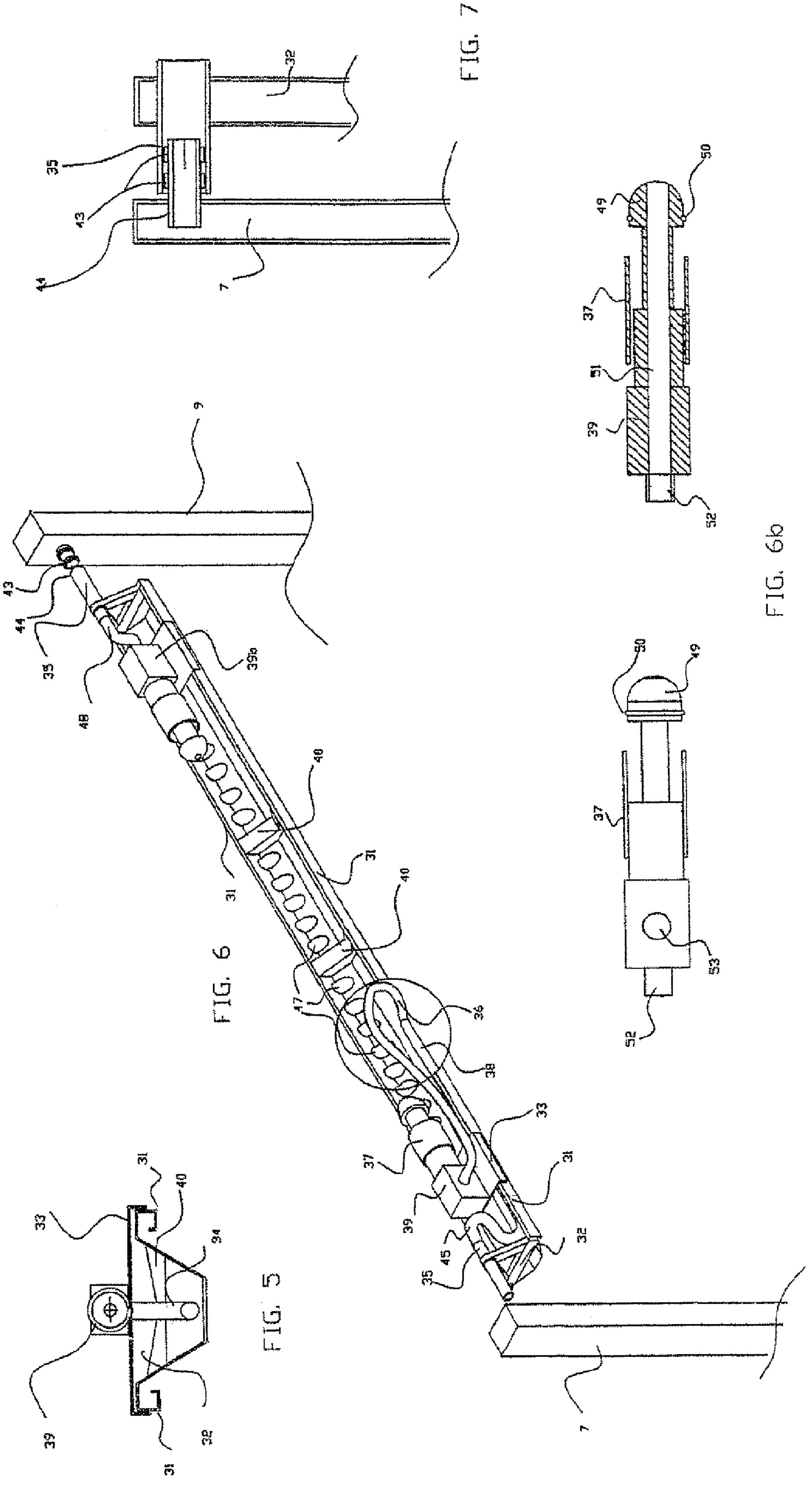
Figure 8:
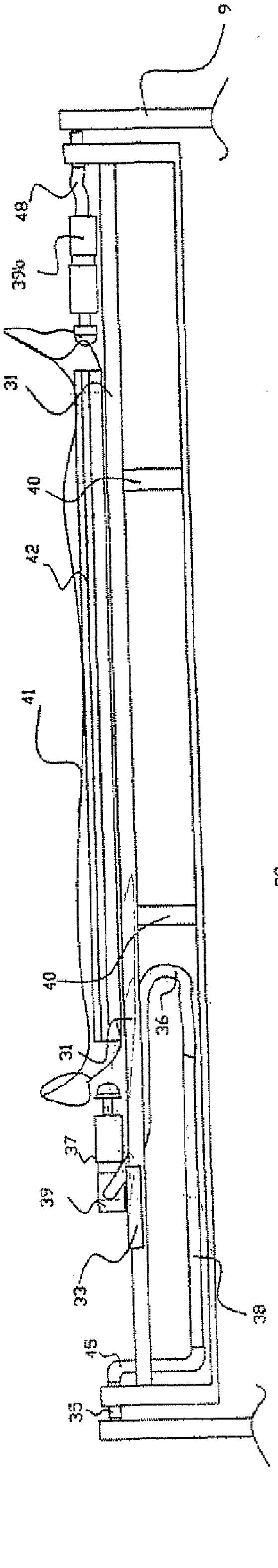
Figure 8B:
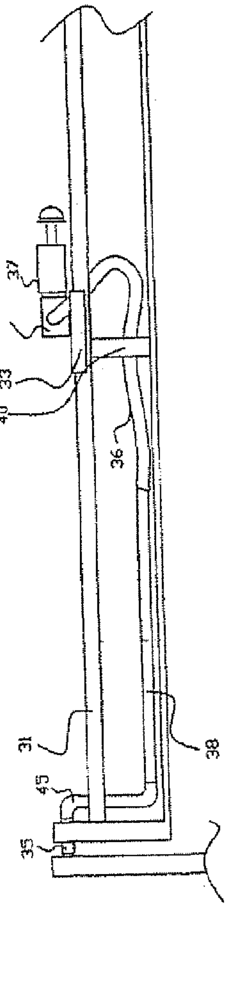
Figure 9:
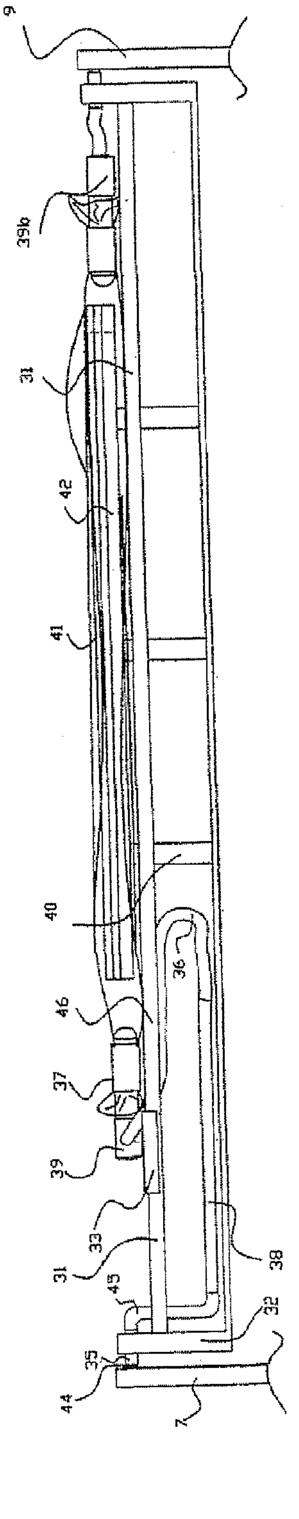
Figure 9B:
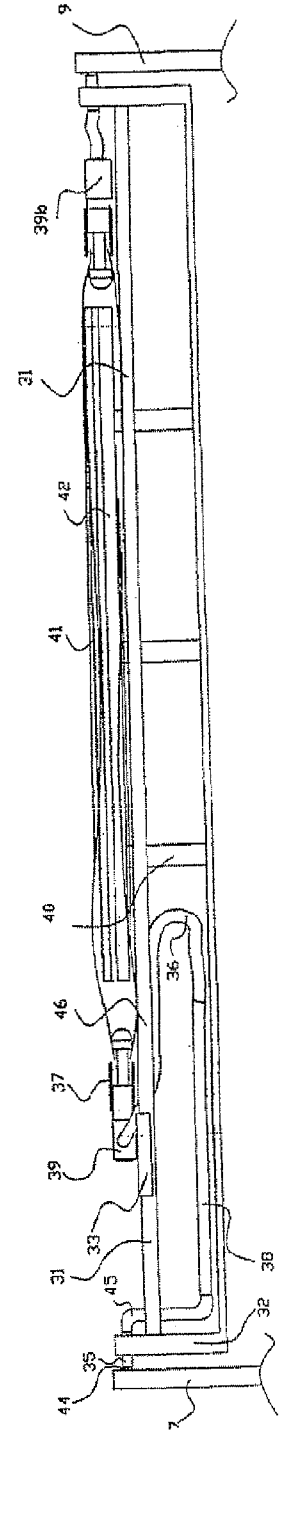

30 of the rotatable carousel 8, in such a way that the hollow shaft 30 can rotate around a longitudinal axis X, in such supports 12, 12*b* by means of the motor 13 connected to said shaft. At the two opposite ends of the shaft 30 a number of homologous internally hollow arms 7, 9 are insertably supported FIG. 7: in this non-exclusive example twelve thereof are shown on each side, i.e. for each end of the shaft 30, thus having a rotatable carousel 8 consisting of twelve cradles 32, although the number of said arms can be varied according to need. At each end of the shaft 30, the arms are fixed together by a further support 6 in the form of a circumference to which they are fixed, FIG. 1*b*. To each arm 7, 9 there corresponds internally of the tubular shaft 30 a chamber 19, which is surrounded by the edges 14 thereof, FIGS. 3, 4; these chambers 19 are insulated from one another. Each arm 7, 9 communicates with the corresponding chamber 19 thereof by means of the joining point 29 thereof with the shaft 30, FIG. 3. The external end part of the arms 7, 9 has perpendicularly at a suitable face a hollow tubular support or pin 44 inserted inside the arm. Said pin 44 has airtight seals 43. This pin 44 on the two arms 7, 9 is used for the purpose of hanging the cradle 32 thereon by means of the coupling with the hollow pins or tubular elements 35 of the cradle 32, the tubular elements 35 being made in such a way as to enable the cradle, once the cradle has been appended, to rotate freely around the pins 44, FIGS. 5, 6, 7. The cradle 32 is fitted with suction ports 39, 39*b* FIGS. 6, 6*b*, one at each end of the cradle. The suction ports 39, 39*b*, are mounted in such a way that on one side the suction port 39*b* is fixed to the cradle 32, whilst on the other side the suction port 39 is connected to a slide 33 that can be slid longitudinally along the external edges 31 of said cradle 32. The arrangement of the rotatable cradles on the tubular elements 35 is for the purpose of maintaining them always in a chosen orientation with respect to the ground during rotation of the rotatable carousel, consisting of the arms 7, 9 inserted in the hollow shaft 30, as shown in FIG. 1. In other words, each cradle 32 defines a resting plane for each profiled section, this resting plane remaining substantially parallel to itself when the cradle 32 is moved by the rotatable carousel 8. FIGS. 8 and 9 show a front view of the cradles 32, with the suction ports 39, 39*b* connected, on the side where the suction ports 39 are mounted on the slide 33, by means of the flexible pipe 36, resistant to high temperatures, to a fixed rigid metal pipe 38, in turn connected by means of a flexible pipe 45 to the tubular element 35 connected to the pin 44 of the arm 7. This arrangement enables the port 39 to be connected to the necessary sucking arrangement that act through the chambers 19 located at the ends of the shaft 30. FIG. 5, in section, and FIG. 6 axonometrically show a type of cradle made of metal sheet that is folded and bored with holes 47 in order to enable the hot air to circulate when the cradle is inside the kiln. The other suction port 39*b*, corresponding to the port 39 but fixed to the cradle, is connected via the flexible pipe 48 to the tubular element 35 that is connected to the arm 9. FIG. 9 show a cradle 32 with a profiled section 42 wrapped in the decorating film 41 resting on the supports 40. In FIG. 9*b* the profiled section is connected to the suction ports according to a known method: the profiled section 42 wrapped in the sublimation film 41 rests on the cradle, FIG. 9; at the open ends of the film, which has acquired the shape of a pipe in which there is arranged the profiled section, there are inserted the suction ports 39 and 39*b;* as the sleeves 37 advance, the film is locked airtight against the seal 50 placed on the head 49 FIG. 6*b*.

The profiled sections normally have a length of 6-7 meters, but this can be shorter in some cases. In order to enable the decoration of profiled sections shorter than the standard ones, the possibility has been provided of shortening the distance between the two suction ports 39, 39*b* through the possibility of advancing one to the other as in FIG. 8. In fact, the slidable slide 33 supporting the port 39, being able to move on the edges 31 of the cradle 32, enables this distance to be shortened whilst maintaining said port 39 fixed to the suction system by means of the fixed pipe 38 and of the flexible pipes 36, 45 FIG. 8*b*. The distribution of the air and the maintenance of the aspiration between the profiled section and the film inside the kiln is achieved by means of a particular configuration of a simple distribution apparatus as in FIG. 3, 4 section AA'. Two opposite circular seals 16, 16*b*, that are of antifriction material resistant to high temperatures, are mounted in coaxial position on the two ends of the tubular shaft 30—FIG. 3 shows an end, the other being identical—in the grooves of these seals there is inserted a pipe 17, which is also coaxial with the shaft 30 of the rotatable carousel 8, this pipe 17 having a greater diameter than that of said hollow rotating shaft 30. Airtight longitudinal seals 23, 23*b*, 24, 24*b*, 25, 25*b* are mounted, in a chosen position, on the pipe 17, which is maintained fixed with respect to the rotation of the shaft 30. These seals separate the space between the pipe 17 and the shaft 30 into three distinct chambers 26, 27, 28, and are arranged in fixed positions, as the pipe 17 does not rotate, FIG. 4. The hollow shaft 30 has holes or slits 20 of a preset dimension comprised between the two seals 16, 16*b*. Each hole 20 is in a region of the shaft 30 longitudinally at the joining position of the arms 7, 9, although the arms 7, 9 are outside the seals 16, 16*b*. In other words, the point in which each arm 7, or each arm 9, joins the shaft 30 and the centre of each hole 20 are aligned along a straight line substantially parallel to the axis X of the shaft 30. These holes 20 place the chambers 26, 27, 28 in contact with the airtight chambers 19 constructed inside the shaft 30 the edges 14 of which terminate on the airtight circular separator 11 placed just beyond the attachment of two diametrically opposite arms 7, 7*b* arranged in an end of the shaft 30, FIG. 3. The circular separator 11 is thus further from the pin 10 than are the arms 7, 7*b*. The hollow arms 7, 9 are in turn in communication with the respective chambers 19 through the joining point 29 thereof on the shaft 30, FIG. 3, 4. The shaft 30 is rotationally indexed by an angle that is such that two opposite arms 7, 7*b*, i.e. arms arranged as radii of a common diameter of the rotatable carousel 8, indicated respectively as loading position B of the profiled sections and unloading position C of the profiled sections, FIG. 4, are always, after advancing, i.e. after rotation by an angle corresponding to a step, in a position parallel to the ground as in Figure I.

At these two positions of the arms 7, 7*b*, the fixed pipe 17 coaxial to the shaft 30 has two inserted pipes 18, 21, the latter connected to the air suction collecting pipe 22, the pipes 18, 21 being respectively in communication with the chamber 28 and with the chamber 26, FIG. 4. The pipe 21 connected to the pipe 22 has an air flow regulator 34. A further pipe 143 connects the pipe 21 to the pipe 22 and comprises the air-flow regulator 34. The pipe 22 that is in communication with the chamber 27 is connected suitably with a sucking blower or sucking impeller 54 by means of a manifold pipe 55. In the manifold pipe 55 there is also inserted the pipe 22*b* of the other end of the shaft 30, homologous to the pipe 22, FIG. 4*b*. The cradle or scale 32 located in the loading position B has the suction port 39 connected to the chamber 26 through the series of pipes, disclosed above, and the hollow arm 7, that ends into the chamber 19 through the hole 29, and the hole 20. In the chamber 26 the pipe 21 is connected that is connected to the pipe 22 FIGS. 4, 4*b*, where the path made by the suction air is indicated by dots. In the pipe 21 there is inserted an adjustable flow control valve 34 for the control of the suction flow produced by the sucking impeller 54 in the pipe 22. The flow control valve 34 is necessary for the purpose of being able to arrange as well as possible the disposition of the film 41 around the profiled section 42 when the profiled section is in the loading position B, using a suction force and therefore a vacuum that is such as to create a partial adhesion force of the film to the profiled section. In these conditions the operators are able to arrange the film as well as possible around the profiled section, adapting it manually, preventing the formation of folds or creases that would ruin the surface of the pattern once it is transferred to the profiled section. After this operation has been performed, the rotatable carousel 8 can be advanced by a step. By the rotation step the cradle with the so prepared profiled section enters the kiln through the opening 4 and a new cradle on which a new profiled section can be loaded takes up its position in the loading position B. As soon as a cradle leaves the loading position B, with the rotation of the shaft 30, by occupying the position D FIG. 4, it becomes connected with the chamber 27 connected directly to the suction pipe 22 connected to the sucking impeller 54 through the manifold 55, so that all the necessary suction force provided for creating a degree of vacuum is applied between the film and the profiled section so as to maintain the perfect adhesion between them during the sublimation step to contrast the steam pressure of the latter.

The rotating path portion of the rotatable carousel from the position D to the position E, the last position occupied by a cradle before leaving the kiln is inside the kiln in such a way that the profiled sections wrapped in the film reach the necessary sublimation temperature. The subsequent step takes the cradle located in E through the outlet opening 4*b* of the kiln to the unloading position C. In this unloading position C the arms 7, 9 of the cradle are connected to the chambers 28 and 28*b* by means of the corresponding semichamber 19, FIGS. 4, 4*b* thereof. The pipe 18*b* ends in a manifold 56*b* that is in turn connected to a blower 57 that blows pressure-adjusted air into the chamber 28. The air, through the hole 20 enters the chamber 19 and from here into the hollow arm 9 supporting the cradle 32 that has reached the unloading position C. The air through the conduit 52 internally of the port 39*b* enters between the film and the profiled section, swelling the film and detaching it from the surface of the profiled section. The air is discharged from the opposite part through the passage into the port 39, the arm 7 and the corresponding homologous chambers 19 and 28 and through the pipe 18 into a discharge pipe 56, FIG. 4*b*. Once the blowing of air has detached the film and has cooled the profiled section, operators unload the profiled section from the cradle. As can be seen from FIG. 1*b*, the number of profiled sections inside the depicted kiln is only five. In this case, by calculating the time for loading and preparing a profiled section in a cradle by operators to be thirty seconds, a profiled section will take one hundred and fifty seconds to pass through the kiln, i.e. two and a half minutes that are necessary for the sublimation, reaching a productivity of two profiled sections per minute, i.e. what is required for one hundred and twenty profiled sections per hour. The reduced number of profiled sections inside the kiln and therefore of the mass to be heated and taken to sublimation temperature also enables significant energy saving with the corresponding economic benefits.

The advantages, that were desired to be achieved, obtained by the apparatus of the invention, despite the simplicity thereof, can be summarised as:

a) extreme compactness of the system: for example the disclosed apparatus occupies only a space of 3 by 8 meters, which is less than half that occupied by similar apparatuses cited in the description;
b) ability to maintain the vacuum required for the film to adhere to the profiled section without losses when the system is moving;
c) productivity that is similar to that of the most complex and costly tunnel kilns;
d) reduction of manpower: in the event of low production the profiled sections can be unloaded by the same operators from the same side as that on which the profiled sections are loaded;
e) reduction of the thermal energy necessary for heating by using a kiln with a bell structure and a reduced mass to be brought to the temperature.

The process and the apparatus of the invention, which is disclosed here according to a particular non-binding embodiment, thus meet all the initially preset objects. The apparatus can also be made maintaining the constructional geometry but changing the shape and the number of the several devices, which are disclosed by way of example but are all similar and analogous and therefore certainly fall within the scope of protection arising from this patent application.

With reference to FIG. 10, there is shown an apparatus 100 for decorating objects through sublimation, in particular profiled sections, for example used in the manufacture of frames for doors, windows, and other things.

With each profiled section there is associated a transferring sheet provided with a sublimable colour decoration. In particular, the transferring sheet can be wrapped around the profiled section in such a way as to form a flexible tubular body provided with open ends.

The apparatus 100 comprises a kiln 101 for heating the profiled sections in such a way that the sublimable colour decoration is transferred from the transferring sheet to the profiled sections.

The kiln 101 is functionally shaped like the kiln 1 disclosed with reference to FIGS. 1, 1*b*, 2 and 2*b*. With respect to the kiln 1 in which there are provided supporting uprights 2, in the kiln 101 an enclosure 51 comprises walls 58 that extend from a roof 66 to the ground or to a plane 67 on which the kiln 101 is installed. In a first wall 62 of the enclosure 51 there is obtained a first opening 64. In a second wall 53 of the enclosure 51 there is obtained a second opening 65, this second wall 53 being opposite the first wall 62. The first opening 64 extends substantially along the entire length of the first wall 62. Similarly, the second opening 65 extends substantially along the entire length of the second wall 53. The enclosure 51 further comprises a third wall 61 and a fourth wall, opposite the third wall 61, that connect the first wall 62 to the second wall 53. The walls 58 of the enclosure 51 enable to limit that the heat produced inside the kiln 101 dissipates to the environment outside the kiln 101. The kiln 101 may comprise inside the enclosure 51 a separating element, which is not shown, arranged substantially parallel to the plane 67 and substantially equal to the base 3 of the kiln 1, to retain the heat in an upper region inside the kiln 101.

Within the enclosure 51 there is housed a carousel 108 that is rotatable around a Y axis and comprises a plurality of arms 107 arranged at an end of a longitudinal shaft and a further plurality of arms, which is not shown, arranged at a further end opposite this end. Each arm 107 comprises a supporting arrangement 60 arranged for supporting a profiled section. The supporting arrangement 60 may comprise a cradle 132. The cradle 132 comprises an elongated element extending between an end part and a further end part, the end part being supported by an arm of said plurality of arms 107 and the further end part being rotatably supported by a further arm of said further plurality of arms. Each cradle 132 can be structurally and functionally shaped like the previously disclosed cradle 32. The cradle 132 thus comprises suction ports arranged at opposite ends of the profiled section to suck air from inside the flexible tubular body shaped with the transferring sheet around the profiled section.

The carousel 108 can be structurally shaped like the carousel 8 disclosed with reference to FIGS. 1, 1*b*, 2, 2*b*. With respect to the carousel 8, each arm 107 of the carousel 108 is extendible between a retracted position F, in which an end 59 of the arm 107 is in a perimeter zone of the rotatable carousel 108, and an advanced position G, in which the end 59 of the arm 107 is arranged on the prolongation of the radium of the carousel 108 outside the carousel 108.

The first opening 64 of the enclosure 51 faces a cradle 132*a* arranged in the loading position B and the second opening 65 of the enclosure 51 faces a cradle 132*b* arranged in the unloading position C, the cradle 132*b* being diametrically opposite the cradle 132*a*. The cradle 132*a* is supported by arms 107*a* of the plurality of arms 107 and the cradle 132*b* is supported by arms 107*b* of the plurality of arms 107.

During operation, the arms 107*a* are taken from the retracted position F to the extracted position G through the first opening 64, in such a way that the cradle 132*a* is extracted from the enclosure 51. An operator loads the cradle 132*a* with a profiled section to be decorated already wrapped in the transferring sheet and inserts at the open ends of the flexible tubular body the suction ports provided on the cradle 123*a*. Once the profiled section has been loaded, the arms 107 move from the advanced position G to the retracted position F, moving the cradle 132*a* inside the enclosure 51 through the first opening 64.

Similarly, the arms 107*b* that support the cradle 132*b* in the unloading position C move from the retracted position F to the advanced position G, extracting from the enclosure 51 the cradle 132*b* through the second opening 65. In this position, an operator can unload the already decorated profiled section from the cradle 132*b*. Subsequently, the arms 107*b* move from the advanced position G to the retracted position F to return the cradle 132*b* inside the enclosure 51 through the second opening 65.

The carousel 108 can subsequently advance by an angular step to enable a cradle 132*a* that has arrived at the loading position B to be loaded with a profiled section to be decorated and simultaneously to enable a profiled section that has already been decorated to be unloaded from a cradle 132*b* that has reached the unloading position C.

The carousel 108 can be loaded and unloaded using only the first opening 64 or only the second opening 65. In other words, it is possible for the loading and unloading operations to occur on the same side of the enclosure 51. This means that the carousel 108 stops in a loading and unloading position, for example corresponding to the loading position B or to the unloading position C, for a longer time than that required for loading and unloading the carousel 108 when simultaneously using both the first opening 64 and the second opening 65. Nevertheless, the number of required operators is in this case halved.

In an embodiment, which is not shown, the enclosure 51 may comprise a single opening, coinciding with the first opening 64, or coinciding with the second opening 65, in such a way that the carousel 108 is unloaded and loaded on the same side of the enclosure 51.

The first opening 64, or the second opening 65, or both the first opening 64 and the second opening 65, can be closed by a closing arrangement 72 arranged for limiting the heat exiting from the enclosure 51 through the first opening 64 or the second opening 65.

The closing arrangement 72 may comprise a piece of flexible material, such as, for example, rubber, provided with a plurality of tabs and fixed at an upper end of the first opening 64 or of the second opening 65, in such a way as to form a curtain that covers the first opening 64 or the second opening 65. In this case, when the arms 107 respectively pass through the first opening 64 and the second opening 65, moving between the retracted position F and the advanced position G, they interact with the piece of flexible material, raising the plurality of tabs. The piece of flexible material enables the arms 107 to pass through the first opening 64 or the second opening 65 and to close the first opening 64 or the second opening 65 when the arms 107 are in the retracted position F.

Alternatively, the closing arrangement 72 may comprise a door 63 that is movable between a closed position in which the door 63 closes the first opening 64, or the second opening 65, and an opening position in which the door 63 does not interact with the first opening 64, or the second opening 65. During operation, before the arms 107 extend from the retracted position F to the advanced position G, the door 63 is driven from the closed position to the opening position in such a way as to open the first opening 64 or the second opening 65. After the arms 107 have moved from the advanced position G to the retracted position F, the door 63 is driven from the opening position to the closed position in such a way as to close the first opening 64 or to the second opening 65.

The door 63 can be slidable along a direction that is substantially parallel to the first wall 62, or to the second wall 53, or can be rotatably connected to the first wall 62, or to the second wall 53, in such a way as to rotate around an axis substantially parallel to the first wall 62, or to the second wall 53 to close the first opening 64 or the second opening 65.

The door 63 can be driven manually or by a driving device that is not shown.

Owing to the closing arrangement 72, the heat dispersed in the environment outside the kiln 101 is extremely reduced.

In an embodiment which is not shown, instead of a transferring sheet wrapped around the object to be decorated in such a way as to form a flexible tubular body it is possible to use a transferring sheet that is simply resting on the object to be decorated. In this case, the cradles do not comprise sucking ports, intended for being inserted in open ends of a flexible tubular body, but comprise a sucking plane on which the object is arranged together with the transferring sheet. The sucking plane comprises a resting plane provided with a plurality of holes connected by means of air conduits to a fan. The transferring sheet is rested on the object to be decorated and partially on the sucking plane. Air interposed between the transferring sheet and the object is sucked through the holes of the sucking plane in such a way that the transferring sheet can adhere to the object to be decorated. Once the decoration has been transferred by sublimation to the object a blower blows air through the holes of the sucking plane in such a way that the transferring sheet, devoid of decoration, can detach itself more easily from the object.

The invention claimed is:

1. Apparatus for decorating objects through sublimation comprising:

a kiln for heating said objects;

a carousel comprising a plurality of arms having a supporting arrangement for supporting said objects, each object being associated with a transferring sheet provided with a sublimable decoration;

a sucking arrangement for sucking air between said transferring sheet and said object, said sucking arrangement comprising a suction port for sucking air from the inside of a tubular body enveloping said object and made with said transferring sheet;

wherein each arm of said plurality of arms comprises a hollow rod arranged for internally conveying air from or to said suction port and wherein said supporting arrangement comprises an end rotatably supported on an arm of said plurality of arms, said arm being fixed near an end part of a rotation shaft of said carousel, and said hollow rod terminating in a chamber obtained inside said rotation shaft.

2. Apparatus according to claim 1, wherein for each arm of said plurality of arms there is provided a hole obtained in an external surface of said rotation shaft, said hole facing said chamber.

3. Apparatus according to claim 2, and further comprising a tubular member surrounding said external surface of said rotation shaft substantially at said hole.

4. Apparatus according to claim 3, wherein between said tubular member and said external surface there is defined an interstice arrangement.

5. Apparatus according to claim 4, wherein said interstice arrangement comprises a plurality of interstitial chambers separated by a dividing arrangement fixed to said tubular member.

6. Apparatus according to claim 5, wherein said plurality of interstitial chambers comprises a first chamber and a second chamber.

7. Apparatus according to claim 6, wherein said plurality of interstitial chambers further comprises a third chamber, opposite said first chamber.

8. Apparatus according to claim 7, wherein said third chamber is connected to a still further pipe.

9. Apparatus according to claim 8, wherein said still further pipe comprises a vent outlet for the air.

10. Apparatus according to claim 6, wherein said first chamber is connected to a pipe and said second chamber is connected to a further pipe.

11. Apparatus according to claim 10, wherein said further pipe is connected to a sucking impeller of said sucking arrangement for sucking air from said first chamber and from said second chamber.

12. Apparatus according to claim 10, wherein said pipe is connected to said further pipe through a conduit provided with a flow adjusting device for adjusting a flow of air coming from said first chamber.

13. Apparatus according to claim 6, wherein said second chamber has a circumferential extent that is greater than said first chamber around said rotation shaft.

14. Apparatus according to claim 5, wherein said dividing arrangement comprises a further airtight element.

15. Apparatus according to claim 5, wherein through said hole said chamber is connectable to each interstitial chamber of said plurality of interstitial chambers during the rotation of said rotation shaft.

16. Apparatus according to claim 3, wherein said tubular member is fixed with respect to said rotation shaft.

17. Apparatus according to claim 2, wherein said hole is substantially longitudinally aligned on a point in which said hollow rod terminates in said chamber along a longitudinal extent direction of said rotation shaft.

18. Apparatus according to claim 1, wherein said carousel is at least partially housed in an enclosure of said kiln.

19. Apparatus according to claim 18, wherein said enclosure comprises peripheral walls extending from a roof to a mounting plane on which said carousel is mounted.

20. Apparatus according to claim 19, wherein said peripheral walls comprise a wall provided with an opening that is traversable by said object.

21. Apparatus according to claim 20, wherein said peripheral walls further comprise a further wall provided with a further opening traversable by said object.

22. Apparatus according to claim 21, wherein said further opening extends along a main extent direction of said further wall.

23. Apparatus according to claim 21, wherein said further wall is opposite said wall.

24. Apparatus according to claim 20, wherein said opening extends along a main extent direction of said wall.

25. Apparatus according to claim 18, wherein said enclosure is supported by uprights arranged around said carousel.

26. Apparatus according to claim 18, wherein said kiln comprises a heating device arranged in said enclosure above said carousel.

27. Apparatus according to claim 1, wherein said supporting arrangement comprises a further end rotatably supported on a further arm of said plurality of arms, said further arm being substantially parallel to said arm.

28. Apparatus according to claim 27, wherein said further arm is fixed near a further end part of said rotation shaft, said further end part being opposite said end part.

29. Apparatus according to claim 28, wherein said supporting arrangement comprises an elongated element extending between said end and said further end.

30. Apparatus according to claim 29, wherein said elongated element comprises a concave surface.

31. Apparatus according to claim 30, wherein said concave surface is provided with holes.

32. Apparatus according to claim 29, wherein said elongated element comprises supporting members arranged in consecutive cross sections of said elongated element and arranged for supporting said object.

33. Apparatus according to claim 32, wherein said elongated element comprises a concave surface, between said concave surface and said supporting members there being defined passages to enable the air to flow below said object.

34. Apparatus according to claim 1, wherein said end comprises a suspension arrangement arranged for suspending said supporting arrangement to said arm.

35. Apparatus according to claim 34, wherein said suspension arrangement comprises a tubular element arranged for surrounding at least partially a pin arrangement provided in said arm.

36. Apparatus according to claim 35, wherein said pin arrangement comprises a hollow pin.

37. Apparatus according to claim 35, wherein between said tubular element and said pin arrangement there is provided an airtight element.

38. Apparatus according to claim 34, wherein said suspension arrangement defines a portion of a path for the air in said sucking arrangement.

39. Apparatus according to claim 38, wherein said suction port is connected to said path through a plurality of air conduits.

40. Apparatus according to claim 1, wherein each arm of said plurality of arms is extendible between a retracted position, wherein said arm does not substantially project beyond said carousel and an advanced position wherein said arm extends along a prolongation of a radius outside said carousel.

41. Apparatus according to claim 40, wherein said carousel is at least partially housed in an enclosure of said kiln, said peripheral walls comprise a wall provided with an opening that is traversable by said object, said peripheral walls further comprise a further wall provided with a further opening traversable by said object, and in said retracted position said arm is arranged inside said enclosure and in said advanced position said arm projects through said opening, and/or through said further opening, outside said enclosure.

42. Apparatus according to claim 1, and further comprising a blowing device for blowing air between said transferring sheet and said object.

43. Apparatus according to claim 42, wherein said blowing device comprises a fan arranged for pushing air into a still further pipe through a connecting pipe.

44. Apparatus according to claim 1, wherein said carousel is rotatable by angular pitches around a longitudinal axis through a motor.

45. Apparatus according to claim 44, wherein said longitudinal axis is substantially horizontal.

46. Apparatus according to claim 1, wherein said suction port is slidable along a longitudinal extent direction of said supporting arrangement, to move said suction port towards and away from said tubular body.

* * * * *